Feb. 24, 1931.  H. A. TUTTLE  1,794,044
REVERSING MECHANISM
Filed Nov. 10, 1928   3 Sheets-Sheet 1
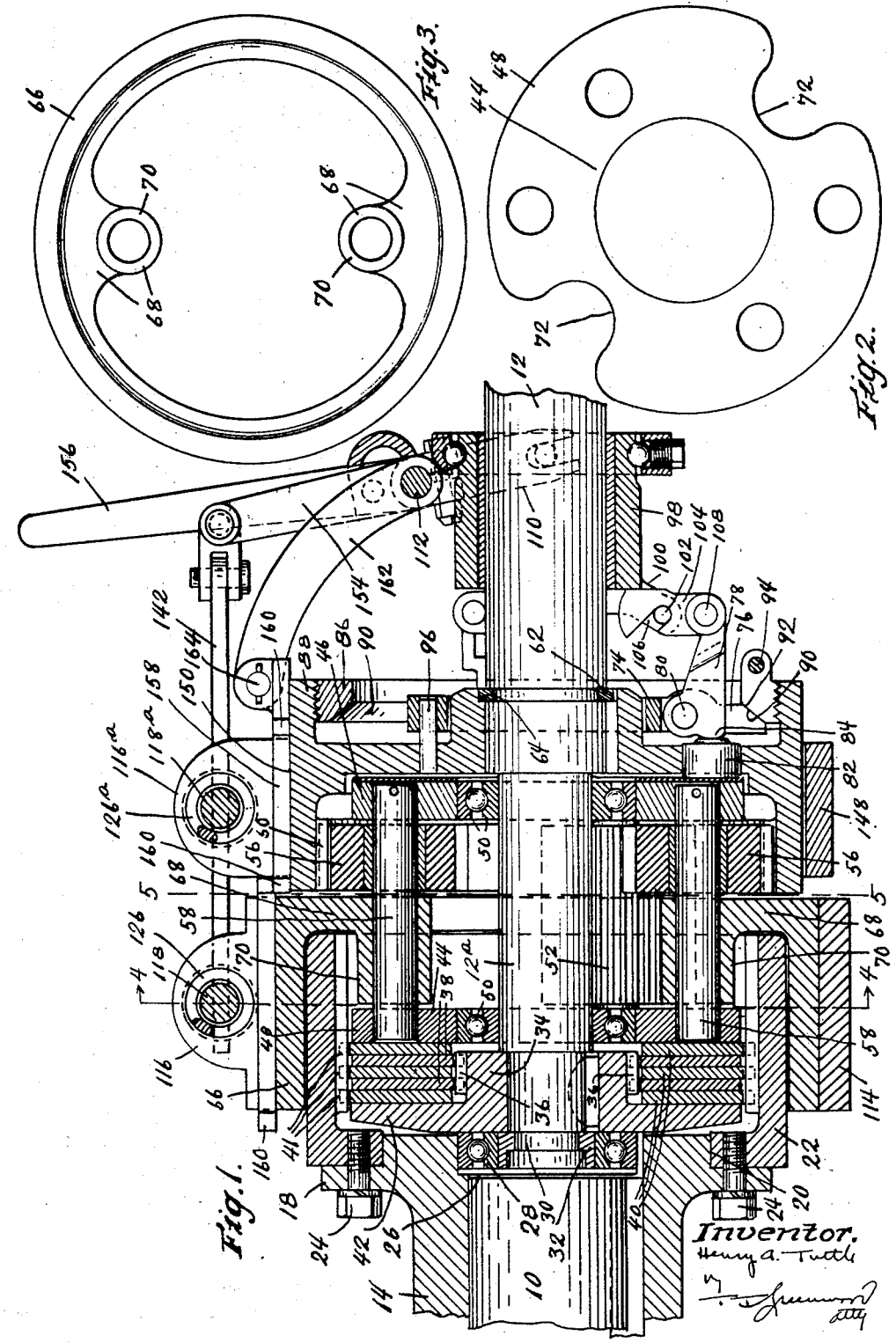

Feb. 24, 1931.  H. A. TUTTLE  1,794,044

REVERSING MECHANISM

Filed Nov. 10, 1928  3 Sheets-Sheet 2

Inventor.
Henry A. Tuttle
by F. Greenwood
atty

Feb. 24, 1931.  H. A. TUTTLE  1,794,044
REVERSING MECHANISM
Filed Nov. 10, 1928   3 Sheets-Sheet 3
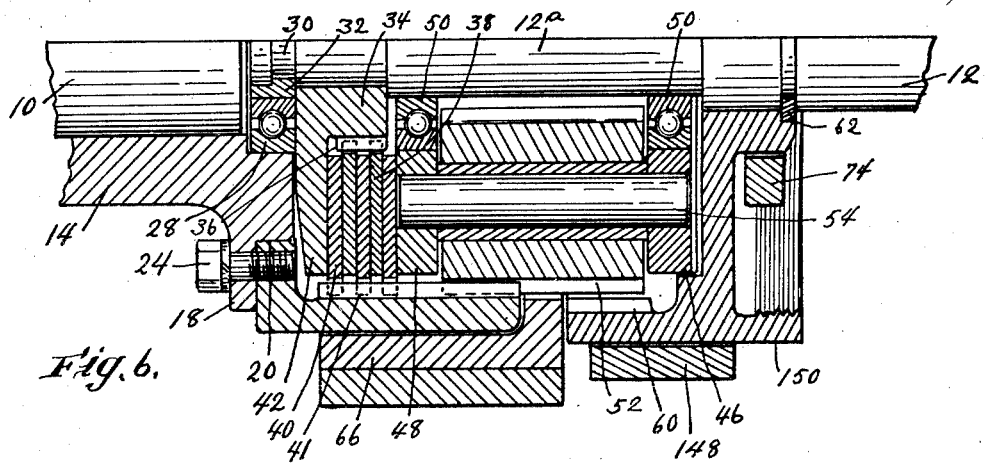
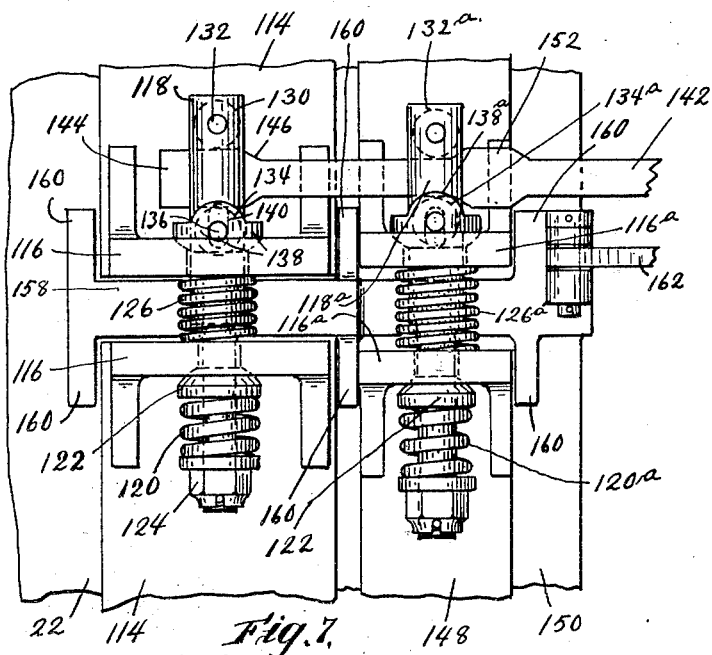
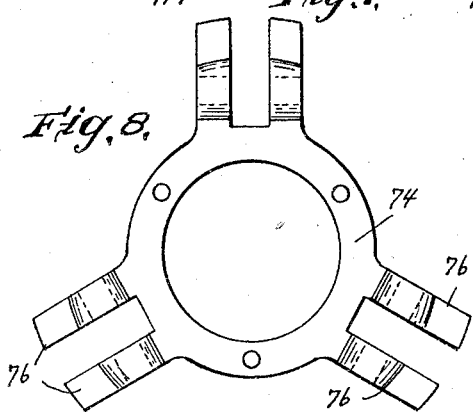
Inventor.
Henry A. Tuttle Patented Feb. 24, 1931

1,794,044

UNITED STATES PATENT OFFICE

HENRY A. TUTTLE, OF UPTON, MASSACHUSETTS; JENNIE L. TUTTLE EXECUTRIX OF SAID HENRY A. TUTTLE, DECEASED

REVERSING MECHANISM

Application filed November 10, 1928. Serial No. 318,539.

This invention relates to reversing mechanisms of the planetary type especially adapted, although not limited, to boat propulsion.

One of the objects of the present invention is an improved reversing gearing whereing clutch mechanism is provided to connect the driving and driven shafts directly and exclude the reversing gears for forward drive.

Another object of the invention is the provision of a reversing gearing having internal gears on both the driving and driven shafts and reversing pinions connecting said internal gears, combined with a clutch mechanism located in the forward part of the reversing gearing to connect the shafts positively together and exclude the gearing for forward drive.

Another object of the present invention is the provision of a reversing gearing so arranged that the reversing pinion gears rotate at a relatively slow speed when the gearing is set for reverse drive.

In the usual type of reverse gearing there is a considerable drag on the driven or propeller shaft when the gear is in neutral and the driving or engine shaft is rotating. This drag is objectionable since it causes the propeller shaft to rotate and thus tends to propel the boat forwardly when the propeller shaft is supposed to be stationary.

It is another object of this invention to provide a reversing gearing especially designed to provide means to hold the propeller shaft stationary when the gearing is in neutral and the propeller shaft is free from positive driving connection with the driving shaft.

A yet further object of the invention is the provision of a reversing gearing especially arranged for the application of a brake to a part thereof that is fixed to the propeller shaft so that the propeller shaft can be held stationary when the gear is in neutral.

A yet further object is generally to improve the construction and operation of reversing gearings.

Fig. 1 is a longitudinal sectional elevation through a reversing mechanism embodying the invention.

Fig. 2 is an end view of the floating pinion gear carrier.

Fig. 3 is an end view of the gear carrier brake drum.

Fig. 6 is a partial sectional elevation through the long pinion gear, taken along line 6—6 of Fig. 4.

Fig. 7 is a plan detail of the gearing of Fig. 1 and illustrating especially the means for operating the reverse and neutral brakes.

Fig. 8 is an elevation of the spider that carries the clutch-operating levers.

Figure 4:
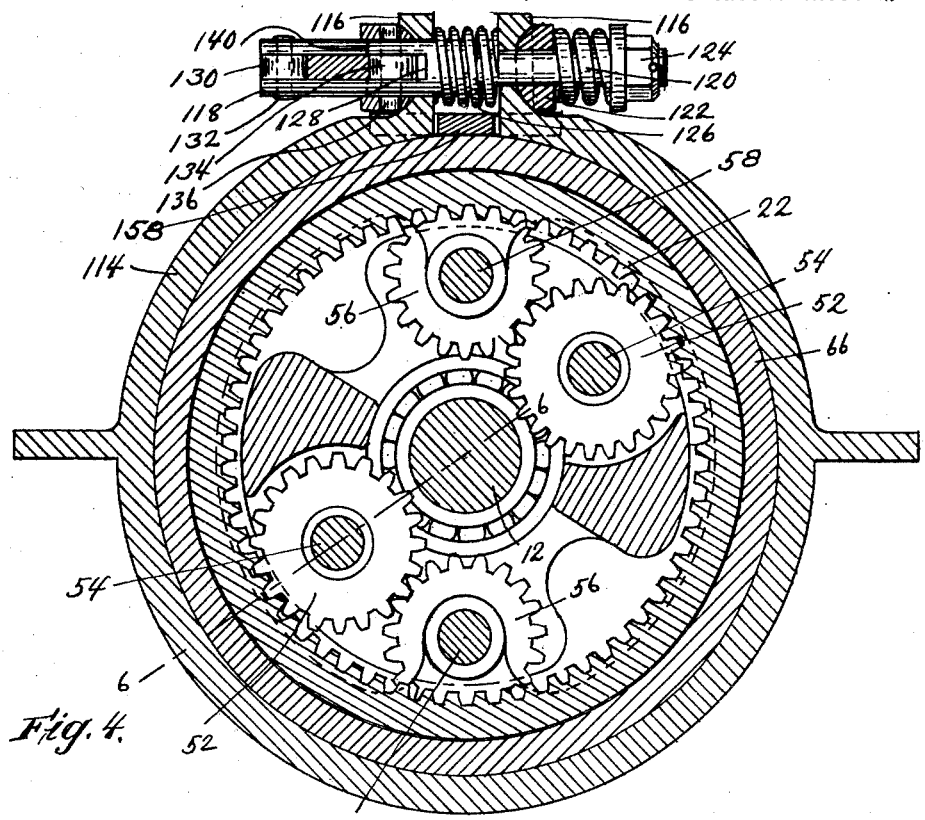
Fig. 4 is a section along line 4—4 of Fig. 1.

The reversing mechanism here shown includes the driving or engine shaft 10 and the driven or propeller shaft 12, the shafts being aligned with each other. A hub 14 is keyed to the end of the engine shaft and has a radially outstanding flange 18 that is provided with an annular seat 20 on which an internal gear 22 is received and is secured to said flange by bolts 24. Said hub is provided with an internal annular recess 26 in which a ball bearing 28 is received. The forward end of the propeller shaft is provided with an annular groove 30 in which a two part or split ring 32 is located. Said ring is received within said ball bearing and thus provides a rotatable support for the front end of the driven shaft and holds the two shafts in axial alignment.

A hub 34 is received on the end of the driven shaft and between the bearing and the enlarged intermediate section 12a of the shaft and is keyed therein and also is held on the shaft against axial movement by engagement with the forward shoulder of said enlarged section and also by engagement with the split collar 32. Said hub 34 constitutes a clutch plate carrier and is provided with external gear teeth 36 or other suitable means to engage a plurality of clutch plates 38. Said clutch plates are provided with internal gear teeth that are in mesh with the external gear teeth 36 so that the clutch plates are free for axial movement on the carrier but are constrained for conjoint rotation therewith. Cooperating clutch plates 40 are located within the internal gear 22 and have external gear teeth 41 that are in mesh with the internal gear teeth of said gear. The carrier 34 is provided with a radial outstanding flange 42 at its forward end which constitutes an abutment against which the clutch plates are adapted to be pressed to set the clutch and thereby to connect the driving and driven shafts directly for forward drive.

Figure 5:
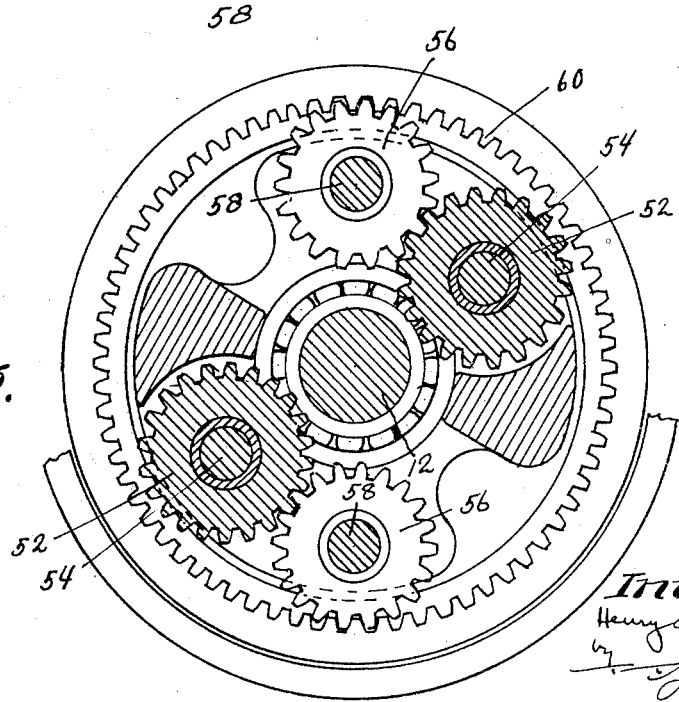
Fig. 5 is a section along line 5—5 of Fig. 1.

A pinion gear carrier 44 is disposed partly within the internal gear 22 and surrounds the intermediate portion 12a of the driven shaft. Said pinion carrier consists of integrally connected and axially spaced and radially outstanding end plates 46 and 48 respectively which are rotatably mounted on ball bearings 50 carried by and movable axially on the driven shaft. A pair of long pinion gears 52, see especially Figs. 4, 5 and 6, are located between the end plates of the carrier and are journalled on pins 54 supported on their ends by said end plates. Said gears are in mesh with the internal gear 22. Short pinion gears 56 are in mesh with said long pinion gears and are journalled on pins 58 of the gear carrier. An internal gear 60 is keyed to the driven shaft 12 at the rear of the intermediate section 12a thereof and is held against rearward movement on said shaft by a two-part or split ring 62 which is received within an annular groove 64 in said shaft. Said gear is in mesh with the short pinion gears 56. With this arrangement, when the pinion gear carrier 44 is held stationary, the gearing is set for reverse drive. When the pinion carrier is released and is floating on the driven shaft and the clutch is set, the gearing is set for forward drive and the power is transmitted directly from the driving shaft to the driven shaft without passing through the pinion gears.

The pinion gear carrier is held stationary by brake mechanism which includes a brake drum 66 that closely encircles and overlies the driving internal gear 22. Said brake drum has at the rear end thereof a pair of radially inwardly extended arms or projections 68, see especially Fig. 3, which terminate in axially-extended bosses 70 that are located within the internal gear and between the end plates of the pinion carrier and are received on the pins 58 beside the short pinion gears 56. Thus the brake drum is connected positively with the floating pinion carrier and when the brake drum is held stationary the pinion gear carrier also is held stationary. The pinion gear carrier has a pair of opposed notches 72 in one of its end walls, see especially Fig. 2, which permit the passage of the bosses 70 of the brake drum into the space between the end plates of the gear carrier so that the brake drum can be attached to the carrier.

The driving and driven internal gears are spaced axially to permit the arms 68 of the brake drum 66 to pass therebetween without rubbing thereagainst.

The clutch mechanism is set by moving the pinion gear carrier forwardly into pressure-applying relation with the sets of clutch plates. To this end a spider 74 is located at the rear of the driven internal gear 60 and has pairs of spaced outstanding arms 76, see especially Fig. 8. Levers 78 are located between said arms and are pivoted on pins 80 extended through said arms. Thrust pins 82 are slidably received in the flange of the internal gear 60 and are adapted to bear against the rear end plate 46 of the gear carrier to move the carrier forwardly to set the clutch. Said levers have toes 84 which are brought into pressure applying relation with the rear ends of the thrust pins 82 when the levers are rotated in a clockwise direction whereby to move the gear carrier forwardly and set the clutch.

A split ring 86 is screw threaded within a cylindrical extension or drum 88 of the driven internal gear 60 and has a front arcuate face 90. The rear ends of the arms 76 are provided with corresponding arcuate faces 92 that are seated on said face of the ring. The ring thus supports the spider against axial movement when the clutch is operated and, by reason of the engaging arcuate faces, the spider is automatically self-centering on the ring. The ring can be rotated within the drum 88 to compensate for wear between the clutch plates. The ring can be clamped in any set position by the clamping screw 94 that is extended between the ends of the ring and serves to spread them apart. The spider is loosely received on a pin 96 carried by the internal gear 60 so that the spider is free for axial movement thereon but is constrained for conjoint rotation therewith. The construction of the split ring 86 is disclosed and claimed in my copending application Serial No. 180,705, filed April 4, 1927.

The clutch operating levers 78 are operated by means including a sleeve 98 which is free and is slidable axially on the driven shaft. The sleeve at its forward end is provided with pairs of spaced outstanding ears 100 which have pins 102 extended therethrough on which links 104 are loosely received. Said links have open slots 106 in which said pins are located. The outer ends of said links are pivotally connected to pins 108 carried by the outer ends of the levers 78. When the sleeve 98 is moved rearwardly the links 104 are moved into a vertical position and thus force the levers 78 outwardly and set the clutch. When the sleeve is moved in the opposite direction the clutch setting pressure is removed and the clutch plates separate by their inherent resiliency. The construction of the links 104 is also disclosed in my copending application Serial No. 291,333, filed July 9, 1928.

The sleeve 98 is moved axially by means including a yoke 110 which is pivotally supported by a transversely extended or cross shaft 112.

Brake mechanism is provided to hold the gear carrier stationary to secure reverse drive. Other brake mechanism is provided to hold the driven shaft stationary when the gearing mechanism is in neutral. The brake mechanism to secure reverse drive includes a resilient brake band 114 which encircles the brake drum 66 and is adapted to be contracted into frictional engagement therewith and hold it stationary. Said brake band is provided with a pair of spaced upstanding ears 116, see especially Figs. 4 and 7, located at the top of the gearing. A rod 118 is loosely extended through aligned passages in said ears. A compression spring 120 encircles one end of the rod beyond one of said ears and bears against a conically faced member 122 that has a swivelled seat on said ear. A nut 124 is screw threaded on the end of said rod and serves as an abutment for the other end of said spring and also to vary the tension thereon. A lighter spring 126 encircles said rod between said ears 116 and bears against both of said ears for the purpose of spreading the ends of the brake band apart when the compressional force thereon is removed. The other end of the rod 118, beyond the other ear, is provided with an axially disposed slot 128 therein. A roller 130 is located in said slot at the end of the pin and is journalled on a pivot pin 132 carried by the rod. A second roller 134 is located at the other end of said slot and is carried on a pin 136 that is secured in a conically faced member 138 that bears against and is self-centered on the other brake ear. Said rod is provided with opposed slots 140 in which said pivot pin 136 is loosely extended.

The brake operating mechanism includes a longitudinally-movable brake operating bar 142 which has an enlarged end 144 and inclined cam faces 146 extending from the narrow body portion to the enlarged end thereof. Said bar is adapted to bear against both of said rollers 130 and 134. When the bar is moved to the right, Fig. 7, to bring the enlarged end 144 thereof between said rollers, it is apparent that the rod 118 will be moved outwardly thereby to move the ends of the brake toward each other and to contract the brake about the brake band. When the bar is moved in the opposite direction, it is apparent the brake will be released and the brake will be free to expand by its own resiliency assisted by the action of the spring 126. The spring 120 serves automatically to compensate for the wear between the engaging surfaces of the brake so that adjustments to take up wear are not frequently needed.

The brake mechanism to hold the driven or propeller shaft stationary when the gear is in neutral includes a "neutral" brake band 148 which encircles the outer cylindrical face 150 of the driven internal gear 60 fixed to the driven shaft. The neutral brake band 148 is similar in construction to the reverse brake band 114. A rod 118a is passed through the confronting ears 116a at the ends of the neutral brake band and has a spring 120a bearing at one end against said rod and at the other end against one of the ears of the brake band. A spring 126a is located on said rod between the ears of the brake band for spreading the band apart. The rod is provided with a slot in which the brake operating bar 142 is movably received. A cam roller 132a is rotatably located in one end of the slot and a second cam roller 134a carried by the conically faced member 138a is received in the other end and is movable axially of the slot. The operating bar 142 is provided with an enlarged intermediate section 152 which is adapted to be passed between the rolls 132a and 134a for the purpose of contracting the brake band about the internal gear 60.

In the position of the two brake bands and the operating bar shown in Fig. 7, the reverse brake band 114 is shown contracted about the brake drum of the gear carrier whereby to set the gearing for reverse drive. The neutral brake band 148 is free from engagement with the driven gear 60. The clutch mechanism also is in an inoperated condition. When the operating rod 142 is moved sufficiently to the left to bring the intermediate enlarged portion 152 thereof between the rolls 132 and 134a the reverse brake band 114 will be released and the neutral brake band 148 will be set whereby to hold the driven shaft stationary. The clutch mechanism will continue to remain in an unoperated condition. When the operating bar is moved further to the left, the neutral brake band will be released and the clutch mechanism will be set to secure forward drive. The bar 142 is pivotally connected to an arm 154 fixed to the yoke 110 so that it can be operated by the operating handle 156 conjointly with the clutch operating mechanism.

Thus, it will be seen that when the reverse brake band is set and also when the clutch mechanism is set, the neutral brake band 148 will be free but when both the clutch and the reverse brake are free, the neutral brake will be set.

There is a tendency for the operating rod 142 to move the brake bands 114 and 148 axially while contracting them. Means are provided herewith to prevent such axial movement. Said means includes a plate 158 which is located between the confronting ends of both brake bands and overlies and bears upon the brake drum 66 and 150. Said plate is narrower than the space between the ends of the brake bands when they are fully contracted about the drums. Said plate is provided at its ends and also intermediate its ends with opposed circumferentially extended ears 160 which overlie the opposite sides of both brake bands at the ends thereof. Thus, said projections are in position to be engaged by and prevent axial movement of the brake bands in either direction. Said plate is held in the aforesaid relation by a link 162 which is pivoted at its forward end on a pin 164 carried by the rear end of said plate and is also pivoted at its rear end on the cross shaft 112, thereby supporting said plate and consequently the brake bands against axial movement.

I claim:

1. Reversing mechanism including the combination of driving and driven shafts, an internal gear fixed to each shaft, a floating pinion gear carrier located within said internal gears, intermeshing pinion gears carried by said carrier in mesh with said internal gears, brake mechanism to hold said floating gear carrier stationary to secure reverse drive, and clutch mechanism located within the internal gear of said driving shaft forwardly of said pinion gear carrier connecting said shafts directly for forward drive.

2. Reversing mechanism including the combination of driving and driven shafts, an internal gear fixed to each shaft, a floating pinion gear carrier located within said internal gears, intermeshing pinion gears carried by said carrier in mesh with said internal gears, brake mechanism for holding said carrier stationary to secure reverse drive, and clutch mechanism located within the internal gear of said driving shaft for connecting said shafts directly for reverse drive.

3. Reversing mechanism including the combination of driving and driven shafts, an internal gear fixed to each shaft, a floating pinion gear carrier located within said internal gears, intermeshing pinion gears carried by said carrier in mesh with said internal gears, brake mechanism for holding said carrier stationary to secure reverse drive, and clutch mechanism for connecting said shafts directly for forward drive, said clutch mechanism including co-operating sets of clutch plates located within the internal gear on said driving shaft, some of said plates having a driving connection with said gear and others of said plates having a driving connection with said driven shaft.

4. Reversing mechanism including the combination of driving and driven shafts, gears fixed to said shafts, a floating, axially movable pinion gear carrier, intermeshing pinion gears carried by said carrier meshing with said shaft gears, brake mechanism to hold said pinion carrier stationary to set the reversing mechanism for reverse drive, clutch mechanism located between said shaft gears connecting said driving and driven shafts directly for forward drive, and clutch operating mechanism including means to move said pinion gear carrier axially to set the clutch mechanism.

5. Reversing mechanism including the combination of aligned driving and driven shafts, gears fixed to said shafts, the driving shaft gear having a hub which connects it with said driving shaft, a floating pinion gear carrier rotatable and axially movable on said driven shaft, intermeshing pinion gears carried by said carrier in mesh with said shaft gears, brake mechanism to hold said pinion gear carrier stationary to secure reverse drive, clutch mechanism surrounding said driven shaft and located in the axial space between said driving shaft gear hub and said pinion gear carrier arranged to connect said shafts directly for forward drive, and clutch operating mechanism including means to move said pinion gear carrier axially to set the clutch mechanism.

6. Reversing mechanism including the combination of aligned driving and driven shafts, internal gears fixed to said shafts, a floating pinion gear carrier rotatably and axially movable on said driven shaft within said internal gears, intermeshing pinion gears carried by said carrier meshing with said internal gears, brake mechanism to hold said pinion carrier stationary for reverse drive, clutch mechanism for connecting said shafts directly and excluding said gears for forward drive including cooperating sets of clutch plates located within said driving shaft internal gear and between said driving shaft and pinion gear carrier and having driving connections respectively with said driving shaft internal gear and said driven shaft, and clutch operating mechanism including means to move the said pinion gear carrier axially into pressure applying relation with said clutch plates.

7. Reversing mechanism including the combination of aligned driving and driven shafts, gearing connecting said shafts for reverse drive including an internal gear fixed to said driving shaft, a gear fixed to said driven shaft, a floating pinion gear carrier rotatable and axially movable on said driven shaft, intermeshing pinion gears carried by said carrier meshing with said shaft gears, a clutch plate carrier fixed to said driven shaft within said internal gear and between said driving shaft gear and pinion gear carrier, cooperating sets of clutch plates connected with and carried by said internal gear and clutch plate carrier respectively, and clutch operating mechanism including means to move said pinion gear carrier axially into pressure applying relation with said clutch plates.

8. Reversing mechanism including the combination of aligned driving and driven shafts, gearing connecting said shafts for reverse drive including an internal gear fixed to said driving shaft, a gear fixed to said driven shaft, a floating pinion gear carrier rotatable on said driven shaft, intermeshing pinion gears carried by said carrier in mesh with said shaft gears, brake mechanism to hold said pinion gear carrier stationary to set the gearing for reverse drive, clutch mechanism connecting said shafts directly for forward drive including a clutch plate carrier located within said internal gear and between said driving and pinion gear carrier and fixed to said driven shaft, cooperating sets of clutch plates carried by and connected with said internal gear and clutch plate carrier respectively, and clutch operating mechanism operatively associated with said pinion gear carrier for applying pressure thereon and moving it axially to set the clutch mechanism.

9. Reversing mechanism including aligned driving and driven shafts, an internal gear having a hub fixed to said driving shaft, a second internal gear fixed to said driven shaft, a ball bearing for the end of such driven shaft carried by said hub rearwardly of said driving shaft, a floating pinion gear carrier located within said internal gears having ball bearings rotatable and also axially slidable on said driven shaft forwardly of the driven shaft internal gear, intermeshing pinion gears carried by said carrier in mesh with said internal gears, means to hold said pinion gear carrier stationary for reverse drive, a clutch plate carrier located within said driving shaft internal gear and fixed to said driven shaft forwardly of said pinion gear carrier, cooperating sets of clutch plates located within said driving shaft internal gear and carried by and connected with said internal gear and said clutch plate carrier respectively whereby to connect said shafts directly for forward drive, and clutch operating mechanism including means to move said gear carrier axially into pressure applying engagement with said clutch plates.

10. Reversing mechanism including the combination of driving and driven shafts, gearing to connect said shafts for reverse drive including internal gears fixed to said shafts, a floating pinion gear carrier located between said gears, intermeshing pinion gears carried by said carrier in mesh with said internal gears, means to hold said pinion gear carrier stationary to set the gearing for reverse drive, clutch mechanism for connecting said shafts directly for forward drive including cooperating sets of clutch plates located forwardly of said pinion gear carrier within the internal gear of said driving shaft and connected respectively with said internal gear and said driven shaft, and clutch operating mechanism located rearwardly of said internal gear on said driven shaft having thrust pins slidably extended through said driven shaft internal gear for moving said pinion gear carrier axially into pressure applying relation with said clutch plates.

11. Reversing mechanism including the combination of aligned driving and driven shafts, an internal gear fixed detachably to said hub, an internal gear fixed to said driven shaft, means holding said latter internal gear against forward movement axially of said shaft, said shaft having a reduced forward extension over which said internal gear may be removed, a pinion gear carrier rotatable on said forward extension of said driven shaft, intermeshing pinion gears carried by said carrier in mesh with said internal gears, means to hold said pinion gear carrier stationary to secure reverse drive, clutch mechanism connecting said shaft directly for forward drive including a clutch plate carrier fixed to the forward end of said driven shaft, removable means holding said clutch plate carrier against axial movement thereon, cooperating sets of clutch plates carried by said carrier and said driving shaft internal gear respectively, and clutch operating mechanism including means to move said pinion gear carrier axially into pressure applying relation with said clutch plates.

12. Reversing mechanism including the combination of driving and driven shafts, gearing connecting said shafts for forward drive including an internal gear fixed to said driven shaft, gearing elements connecting said internal gear and driven shaft, clutch mechanism located forwardly of said internal gear for connecting said shafts for forward drive, said internal gear having a rearwardly extended drum, a lever carrying member located within said drum, clutch operating levers carried by said member, thrust pins slidable in said internal gear and operated by said levers for setting said clutch mechanism, and means carried by said drum constituting an adjustable abutment for supporting said lever-carrying member against rearward axial movement.

13. Reversing mechanism including the combination of driving and driven shafts, gearing connecting said shafts for reverse drive including internal gears fixed to said shafts in axially spaced relation, a floating and axially movable pinion gear carrier located between said internal gears, intermeshing pinion gears carried by said carrier in mesh with said internal gears, and a brake drum for said pinion gear carrier located mainly externally of said internal gears and having a part extended inwardly of the space between said gears connected to said pinion carrier, and brake mechanism engageable with said drum to hold said carrier stationary for reverse drive, and clutch mechanism connecting said shafts directly for forward drive including sets of clutch plates located forwardly of said pinion gear carrier having driving connections respectively with said driving shaft internal gear and with said driven shaft, and means to move said pinion gear carrier forwardly into pressure-applying relation with said clutch plates.

14. Reversing mechanism including the combination of driving and driven shafts, spaced internal gears fixed to said shafts, a rotatable and axially movable gear carrier located within said internal gears having intermeshing pinion gears which mesh with said internal gears, said gear carrier also having a member fixed thereto extended outwardly between said internal gears, a brake drum fixed to said member, brake mechanism engageable with said drum to hold said carrier stationary for reverse drive, and clutch mechanism connecting said shafts directly for forward drive including sets of clutch plates located forwardly of said pinion gear carrier having driving connections respectively with said driving shaft internal gear and with said driven shaft, and means to move said pinion gear carrier forwardly into pressure-applying relation with said clutch plates.

15. Reversing mechanism including the combination of driving and driven shafts, gearing connecting said shafts for reverse drive including spaced internal gears fixed to said shafts, a pinion gear carrier located within said internal gears having spaced end plates, intermeshing pinion gears carried by said carrier in mesh with said internal gears, a brake drum external of said pinion gears having a part thereof extending inwardly into the space between said internal gears and said end plates, means connecting said part with said end plates, and clutch mechanism connecting said shafts directly and excluding said gearing for forward drive including clutch plates some of which are connected with said driven shaft and others of which are connected with the internal gear of said driving shaft, and means including said pinion gear carrier to effect the engagement of said plates for forward drive.

16. Reversing mechanism including the combination of driving and driven shafts, and gearing connecting said shafts for reverse drive including spaced internal gears fixed to said shafts, intermeshing pinion gears in mesh with said internal gears, a pinion gear carrier located within said internal gears and having spaced end plates, pins carried by said plates providing supports for said pinion gears, a brake drum external of said internal gears having a flange extended inwardly of the space between said internal gears and into the space between said end plates, means including said pins securing said flange to said gear carrier, and brake mechanism engageable with said brake drum to hold the carrier stationary for reverse drive.

17. Reversing mechanism including the combination of driving and driven shafts, spaced internal gears fixed to said shafts, a floating pinion gear carrier located within said internal gears and having spaced end plates, pins carried by and extended between said end plates, intermeshing pinion gears mounted on said pins in mesh with said internal gears, a brake drum having inwardly-directed projections carried by said pins, and brake mechanism engageable with said drum to hold said carrier stationary for reverse drive.

18. In a reversing mechanism, a rotatable pinion gear carrier having spaced end plates, pinion gears carried by said carrier between said end plates, and a brake drum surrounding and carried by said carrier and having a connection which is located within the carrier and between one of said end plates and certain of said pinion gears.

19. In a reversing mechanism, a rotatable pinion gear carrier having spaced end plates, pins carried by and extended between said end plates, pinion gears mounted on said pins, and a brake drum surrounding said carrier carried by and having a connection with some of said pins.

20. In a reversing mechanism, a rotatable pinion gear carrier having spaced end plates, pins carried by and extended between said end plates, and a brake drum surrounding said carrier carried by and having a connection with said pins.

21. In a reversing mechanism, a rotatable pinion gear carrier having spaced end plates, pins carried by and extended between said end plates, short pinion gears journalled on said pins adjacent one of said end plates, and a brake drum encircling said carrier having inwardly directed projections which are connected with said pins between said pinion gears and said other end plate.

22. In a reversing mechanism, driving and driven internal gears, a rotatable reversing pinion gear carrier having spaced end plates, pinion gears carried by said carrier and meshing with said internal gears, a brake drum overlying said pinion gear carrier and said driving gear only having projections which are inwardly directed from one end thereof into said carrier, and means connecting said projections with said carrier.

23. In a reversing mechanism, a pinion gear carrier having spaced end plates, pinion gears carried by said carrier, a brake drum surrounding said pinion gear carrier having inwardly-directed projections, one of said plates of said carrier having notches which permit said projections to pass into the space between said end plates, and means connecting said projections with said carrier.

24. Reversing mechanism including the combination of driving and driven shafts, gearing connecting said shafts for reverse drive including an internal gear fixed to said driving shaft, a gear fixed to said driven shaft, a rotatable pinion gear carrier located partly within said internal gear and having intermeshing pinion gears meshing with said internal gear and said driven shaft gear, a brake drum surrounding said internal gear having at one end thereof projections which extend inwardly over an end of said internal gear, means connecting said projections and pinion gear carrier internally of said carrier, and brake mechanism for holding said brake drum stationary to secure reverse drive.

25. Reversing mechanism including the combination of driving and driven shafts, clutch mechanism connecting said shafts for forward drive, gearing connecting said shafts for reverse drive including internal gears fixed to said driving and driven shafts, a rotatable pinion carrier, intermeshing pinion gears carried by said carrier in mesh with said internal gears, means for holding said pinion carrier stationary to set the gearing for reverse drive, and brake mechanism associated with said driven shaft internal gear for holding said gear and also said driven shaft stationary.

26. Reversing mechanism including the combination of driving and driven shafts, clutch mechanism connecting said shafts for forward drive, gearing connecting said shafts for reverse drive including internal gears fixed to said driving and driven shafts, a rotatable pinion carrier, intermeshing pinion gears carried by said carrier in mesh with said internal gears, means for holding said pinion carrier stationary to set the gearing for reverse drive, said driven shaft internal gear constituting a brake drum, and brake mechanism associated with said drum for holding it stationary.

27. Reversing mechanism including the combination of driving and driven shafts, clutch mechanism connecting said shafts for forward drive, gearing connecting said shafts for reverse drive including a brake drum for setting said gearing for reverse drive, a brake band encircling said drum, a second brake drum located adjacent said first brake drum and fixed to said driven shaft, and operating mechanism for both of said brake bands including an axially movable cam operating member overlying and common to both brake bands.

28. Reversing mechanism including the combination of driving and driven shafts, clutch mechanism connecting said shafts for forward drive, gearing connecting said shafts for reverse drive including a brake drum for setting said gearing for reverse drive, a brake band encircling said drum, a second brake drum located adjacent said first brake drum and fixed to said driven shaft, an operating mechanism for both of said brake bands including an operating member which is longitudinally movable between said brake bands.

29. Reversing mechanism including the combination of driving and driven shafts, clutch mechanism connecting said shafts for forward drive, reversing gearing connecting said shafts for reverse drive including a brake drum associated with said gearing, a brake band encircling said brake drum and holding it stationary to set the gearing for reverse drive, means for holding said driven shaft stationary including a second brake drum fixed to said driven shaft adjacent said first brake drum, a brake band encircling said second brake drum for holding it stationary, axially movable operating means for said brake bands, and means supported against axial movement extended between both brake bands having parts that engage both of said brake bands and hold them against axial movement.

30. Reversing mechanism including the combination of driving and driven shafts, confronting internal gears fixed to said shafts, intermeshing pinion gears connecting said internal gears, an axially movable carrier for said pinion gears located between said internal gears, clutch plates located within said driving shaft internal gear forwardly of said carrier and connected respectively to said driving shaft gear and to said driven shaft, means to move said carrier forwardly to set said clutch plates, a reverse brake drum overlying said driving shaft internal gear having a part which is extended freely into the space between said internal gears and has a connection with said pinion gear carrier, a brake band encircling said drum, said driven shaft internal gear constituting a neutral brake drum, a brake band encircling said neutral brake drum and lying beside said reverse brake band, and means to move said pinion gear carrier axially and set said brake bands one at a time.

31. Reversing mechanism including the combination of driving and driven shafts, planetary gearing connecting said shafts for reverse drive including a brake drum to hold parts of said gearing stationary, a brake band encircling said drum, a second brake drum fixed to said driven shaft arranged to hold said shaft stationary when the reversing gearing is idle, a brake band encircling said drum, axially movable operating mechanism for both of said brake bands, and means common to both of said bands arranged to hold them against axial movement caused by the operation of said operating mechanism.

32. In a reversing gearing, a brake drum arranged to hold parts of said gearing stationary to secure reverse drive, a brake band encircling said drum, axially movable operating mechanism for said brake band, and means to hold said brake band against axial movement due to the operation of said operating mechanism including a plate having projections which overlie and engage the opposite ends of said brake band, and means holding said plate in the aforesaid relation.

In testimony whereof, I have signed my name to this specification.

HENRY A. TUTTLE.